United States Patent
Mukherjee et al.

(10) Patent No.: US 8,036,184 B2
(45) Date of Patent: Oct. 11, 2011

(54) METHOD TO DYNAMICALLY PROVIDE LINK SPECIFIC INFORMATION TO MOBILE CLIENTS

(75) Inventors: Arghya Mukherjee, Mountain View, CA (US); Bhaskar Bhupalam, Sunnyvale, CA (US); Jayaraman R. Iyer, Sunnyvale, CA (US); Venkatanarayana Muppala, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 702 days.

(21) Appl. No.: 11/341,697

(22) Filed: Jan. 27, 2006

(65) Prior Publication Data

US 2007/0177557 A1    Aug. 2, 2007

(51) Int. Cl.
  *H04W 4/00*    (2009.01)
(52) U.S. Cl. ........ 370/338; 370/310; 370/312; 370/331; 455/432.1; 455/432.3; 455/433
(58) Field of Classification Search ............... 455/432.1, 455/432.3, 433; 370/310, 312, 331, 338
  See application file for complete search history.

(56) References Cited

U.S. PATENT DOCUMENTS

| | | | | |
|---|---|---|---|---|
| 6,973,057 | B1 * | 12/2005 | Forslow | 370/328 |
| 7,181,211 | B1 * | 2/2007 | Phan-Anh | 455/432.1 |
| 2004/0072557 | A1 * | 4/2004 | Paila et al. | 455/414.1 |
| 2006/0030319 | A1 * | 2/2006 | Chou et al. | 455/435.1 |
| 2006/0034438 | A1 * | 2/2006 | O'Neill | 379/114.07 |
| 2007/0213048 | A1 * | 9/2007 | Trauberg | 455/432.3 |

OTHER PUBLICATIONS

C. Finseth, "An Access Control Protocol, Sometimes Called TACACS", Network Working Group, RFC 1492, University of Minnesota, Jul. 1993, 21 pgs.
C. Rigney et al., "Remote Authentication Dial in User Service (RADIUS)", Network Working Group, RFC 2138, Apr. 1997, 65 pgs.
C. Perkins, Ed., "IP Mobility Support for IPv4", Network Working Group, RFC 3344, Nokia Research Center, Aug. 2002, printed from website address: http://www.rfc-editor.org/rfc/rfc3344.txt on Nov. 17, 2008, 93 pgs.
D. Carrel and Lol Grant, "The TACACS+ Protocol Version 1.78", Network Working Group, Internet-Draft, Cisco Systems, Jan. 1997, printed from website address: http://tools.ietf.org/html/draft-grant-tacacs-02 on Nov. 17, 2008, 43 pgs.

* cited by examiner

*Primary Examiner* — Kamran Afshar
*Assistant Examiner* — Kathy Wang-Hurst
(74) *Attorney, Agent, or Firm* — Weaver Austin Villeneuve & Sampson LLP

(57) ABSTRACT

The disclosed embodiments enable a Mobile Node to select from or prioritize two or more Foreign Agents using information dynamically provided to the Mobile Node. When a Foreign Agent detects a Mobile Node, it composes an agent advertisement having one or more fields including one or more parameter values. The Foreign Agent then sends the agent advertisement to the Mobile Node. The Mobile Node may then select one of the Foreign Agents, as well as prioritize the Foreign Agents, using the parameter values.

40 Claims, 5 Drawing Sheets

| IP address of Foreign Agent 302 | Priority 304 | Price per transmission of one or more packets 306 | Price per receipt of one or more packets 308 |
|---|---|---|---|
| Price per specified number of bytes transmitted 310 | Price per specified number of bytes received 312 | Price per registration 314 | Price per duration of time registered 316 |
| TTL/Number of hops 318 | QoS 320 | Duration of validity of one or more parameters: time or time period 322 | |

FIG. 3

| IP address of Foreign Agent 302 | | Priority 304 | Duration of validity of priority 402 |
|---|---|---|---|
| Price per transmission of one or more packets 306 | Duration of validity of price per transmission of packet(s) 404 | Price per receipt of one or more packets 308 | Duration of validity of price per receipt of packet(s) 406 |
| Price per specified number of bytes transmitted 310 | Duration of validity of price per transmission of byte(s) 408 | Price per specified number of bytes received 312 | Duration of validity of price per receipt of byte(s) 410 |
| Price per registration 314 | Duration of validity of price per registration 412 | Price per duration of time registered 316 | Duration of validity of price per duration of time registered 414 |
| TTL/Number of hops 318 | Duration of validity of TTL 416 | QoS 320 | Duration of validity of QoS 418 |

FIG. 4

METHOD TO DYNAMICALLY PROVIDE LINK SPECIFIC INFORMATION TO MOBILE CLIENTS

BACKGROUND OF THE INVENTION

The present invention relates to Mobile IP network technology. More particularly, the present invention relates to dynamically providing link specific information to Mobile Nodes, enabling the Mobile Nodes to select the most appropriate Foreign Agent.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one sub-network and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile EP is also described in the text "Mobile IP Unplugged" by J. Solomon, Prentice Hall. Both of these references are incorporated herein by reference in their entireties and for all purposes.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In a Third Generation Partnership Project 2 (3GPP2)/CDMA2000 network, the Foreign Agent is implemented in what is generally referred to as a Packet Data Serving Node (PDSN). In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address. Packets sent by the Mobile Node 6 to the Correspondent Node 18 may also be transmitted via "reverse tunneling." During "reverse tunneling," packets transmitted by the Mobile Node 6 are forwarded via the Home Agent, which forwards the packets to the Correspondent Node 18.

As described above, a Mobile Node may roam from one Foreign Agent to another. Specifically, the Mobile Node may roam to a variety of physical links, each of which may support one or more Foreign Agents. When multiple physical links are simultaneously available to a Mobile Node, the Mobile Node may select a physical link based upon the link state or link quality. Specifically, the link state indicates whether the link is up or down, while the link quality indicates the quality of the link. In order to ascertain the link state or link quality, the Mobile Node must examine each link to assess its desirability.

The Mobile Node also has access to static information associated with each link that enables the Mobile Node to intelligently select the most appropriate physical link. For instance, a Mobile Node may have access to static pricing information that is pre-configured for each physical link. This static pricing information is typically established via an agreement with the service provider.

While the Mobile Node may select a physical link, current Mobile IP standards do not address the selection of a Foreign Agent by a Mobile Node. Moreover, the information associated with a physical link that is typically provided to a Mobile Node is static, rather than dynamic. As a result, a Mobile Node cannot ascertain which Foreign Agent is the most appropriate (e.g., cost-effective) in a particular situation.

In view of the above, it would be beneficial if information could be conveyed dynamically to a Mobile Node. Moreover, it would be desirable if a Foreign Agent could be selected based upon such information.

SUMMARY OF THE INVENTION

Various embodiments of the invention support the dynamic transmission of information to a Mobile Node, enabling the Mobile Node to intelligently select a Foreign Agent via which to register with its Home Agent. This is accomplished, in part, via an agent advertisement transmitted by each Foreign Agent. By enabling a Foreign Agent to transmit information dynamically to a Mobile Node, the Mobile Node may select an appropriate Foreign Agent based upon information obtained from agent advertisements received from two or more Foreign Agents.

In accordance with one aspect of the invention, when a Foreign Agent detects a Mobile Node, it composes an agent advertisement. The agent advertisement includes one or more fields including one or more parameter values. The Foreign Agent then sends the agent advertisement to the Mobile Node.

In accordance with another aspect of the invention, a Mobile Node may receive an agent advertisement from one or more Foreign Agents. When agent advertisements are received from two or more Foreign Agents, the Mobile Node may select one of the Foreign Agents based upon at least a portion of the information (e.g., parameter values) provided in the agent advertisements. Moreover, the Mobile Node may prioritize the Foreign Agents using the parameter values.

In accordance with one embodiment, the agent advertisement may include a variety of parameters. For instance, the agent advertisement may include pricing information such as price per registration of the Mobile Node with a Home Agent via the Foreign Agent, a price per transmission of one or more packets to another node via the Foreign Agent, a price per receipt of one or more packets by the Mobile Node via the Foreign Agent, a price per a number of bytes received via the Foreign Agent, a price per number of bytes transmitted via the Foreign Agent, and/or a price per duration of time that the Mobile Node is registered with its Home Agent via the Foreign Agent.

In accordance with another embodiment, an agent advertisement may include other information, such as a priority of the Foreign Agent with respect to other Foreign Agents. Other information that may be dynamically obtained, such as date and/or time, may also be provided in the agent advertisement.

In accordance with yet another embodiment, the agent advertisement may include a "duration of validity" field associated with one or more of the parameter values. For instance, the duration of validity may be associated with the entire agent advertisement, and therefore all of the parameters for which a duration is appropriate. Alternatively, a different duration field may be associated with each of the parameters, or those parameters for which a duration is desired. The duration may be specified, for example, via a specified date and/or time, or a time period.

In accordance with another aspect of the invention, the invention pertains to a system operable to perform and/or initiate any of the disclosed methods in a Foreign Agent, Mobile Node, or AAA server. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations. In yet a further embodiment, the invention may be implemented, at least in part, in hardware. For instance, embodiments of the invention may be implemented in an Application Specific Integrated Circuit (ASIC).

These and other features and advantages of the present invention will be presented in more detail in the following specification of the invention and the accompanying figures, which illustrate by way of example the principles of the invention.

BRIEF DESCRIPTION OF THE DRAWINGS

FIG. 3 is a diagram illustrating an exemplary agent advertisement.

FIG. 4 is a diagram illustrating another exemplary agent advertisement.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable information to be conveyed dynamically to a Mobile Node, thereby enabling the Mobile Node to intelligently select a Foreign Agent. In accordance with one embodiment, this is accomplished by transmitting the information in an agent advertisement to the Mobile Node. Upon receiving agent advertisements from two or more Foreign Agents, the Mobile Node may analyze the information and select one of the Foreign Agents based upon this analysis.

As will be described in further detail below with reference to FIGS. 3 and 4, the agent advertisement includes one or more fields for conveying the information to a Mobile Node. When a Foreign Agent composes an agent advertisement, it provides a parameter value in each of these fields and transmits the agent advertisement. In this manner, the most current information affecting the Foreign Agent selection process may be dynamically transmitted to a Mobile Node via an agent advertisement.

Figure 1:
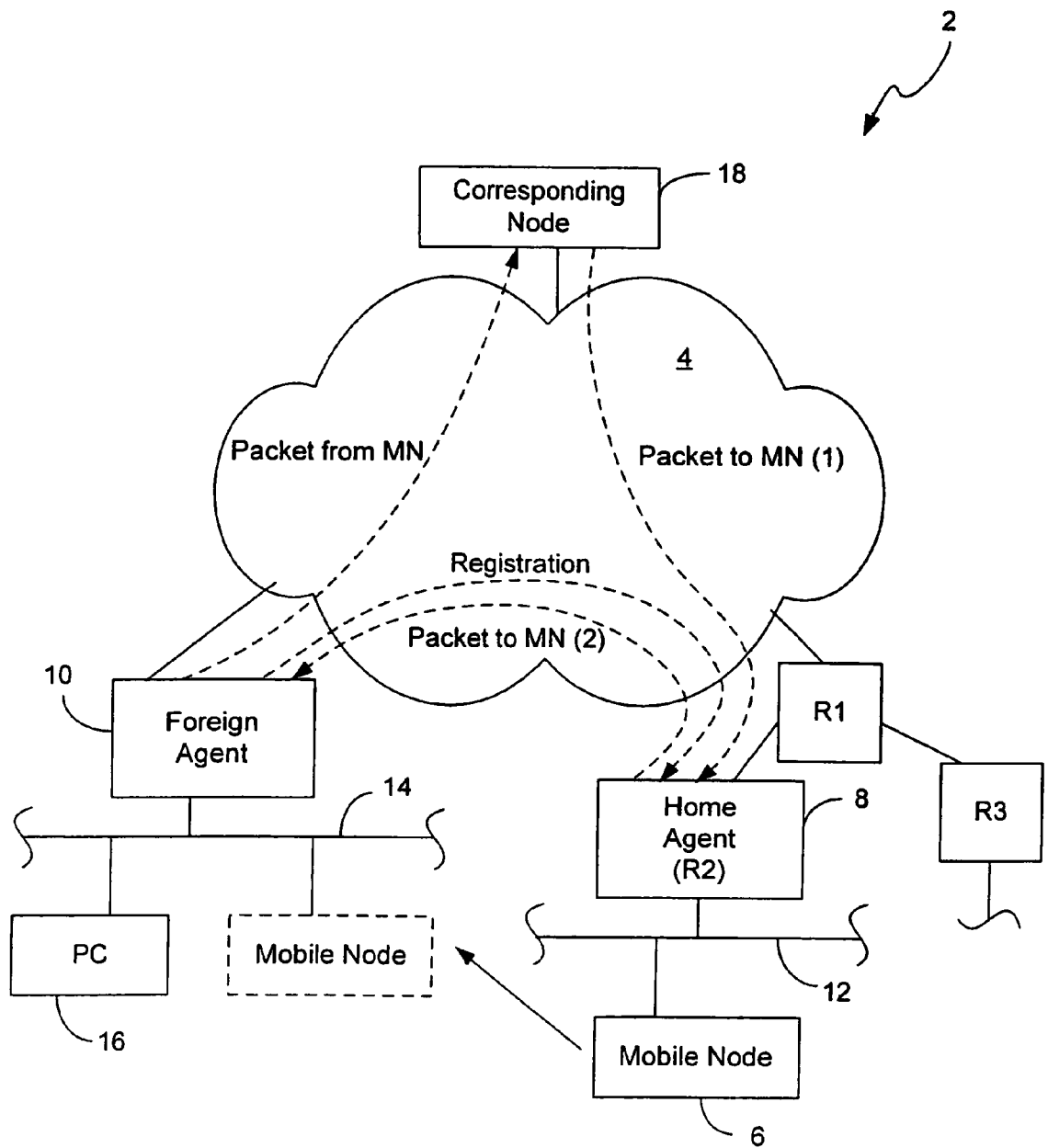
FIG. 1 is a diagram of a Mobile IP network segment and associated environment.
Figure 2:
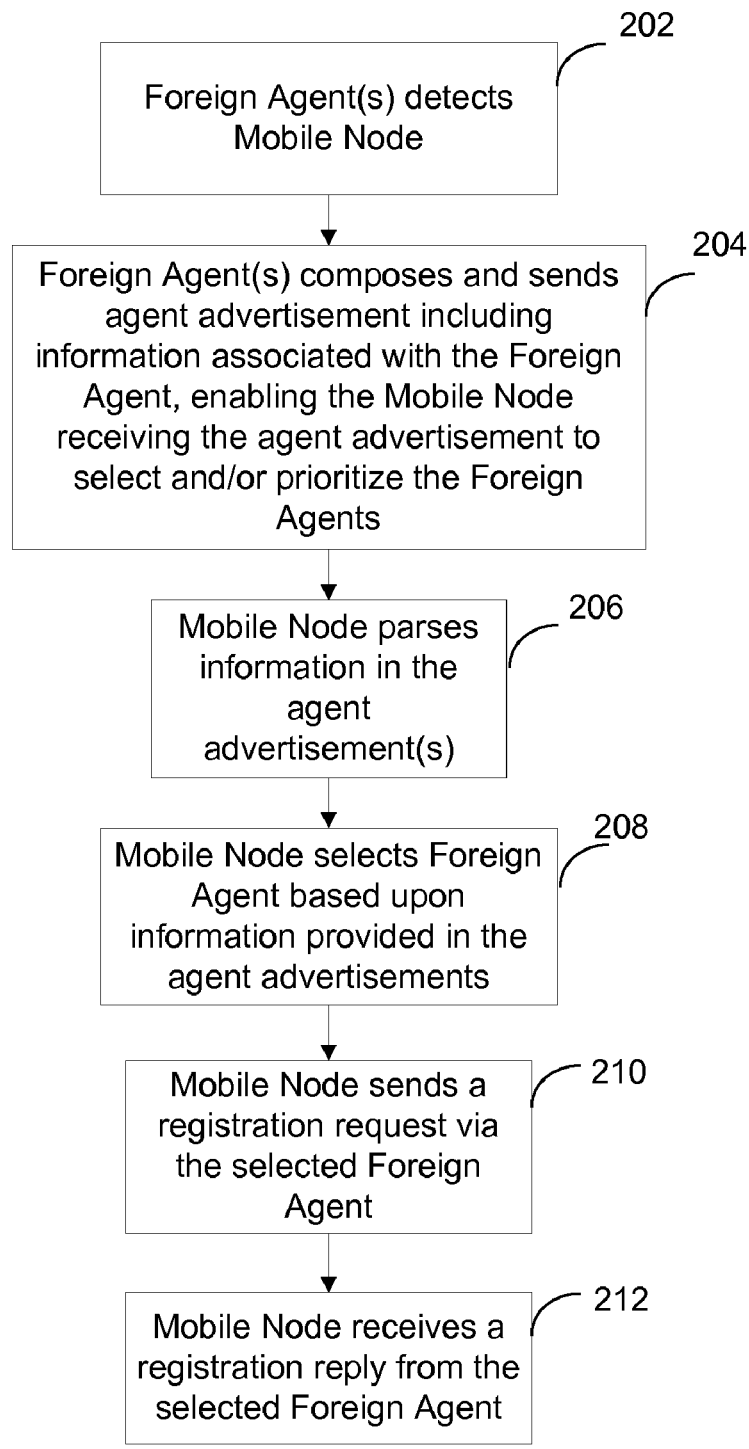
FIG. 2 is a process flow diagram illustrating a method of dynamically providing information to Mobile Nodes in accordance with one embodiment of the invention.

FIG. 2 is a process flow diagram illustrating a method of dynamically providing information to Mobile Nodes in accordance with one embodiment of the invention. As shown in FIG. 2, a Foreign Agent detects a Mobile Node (e.g., in a vicinity of the Foreign Agent) at 202. For instance, the Foreign Agent may detect a Mobile Node upon receiving a data packet or an Address Resolution Protocol (ARP) packet. Upon detecting the Mobile Node, the Foreign Agent composes an agent advertisement including information associated with the Foreign Agent, enabling the Mobile Node receiving the agent advertisement to select and/or prioritize the Foreign Agents.

The information provided in the agent advertisement may be provided as one or more parameter values in one or more fields of the agent advertisement. For instance, the fields may be provided in the body of the agent advertisement or in one or more extensions to the agent advertisement. Exemplary agent advertisements will be described in further detail below with reference to FIGS. 3 and 4.

The Foreign Agent may obtain one or more parameters from a variety of sources. One or more parameter values may be statically configured on the Foreign Agent. Alternatively or in addition, one or more parameters may be obtained by the Foreign Agent dynamically from a server such as a AAA server. The AAA represents authentication, authorization, and accounting. Various protocols such as the Remote Authentication Dial In User Service (RADIUS) and TACACS+ may be implemented to provide such a server. Note that the Home Agent or Foreign Agent providing accounting information to the server must provide communications in formats required by the AAA serverprotocol. RFC 2138 describes the RADIUS Protocol and is hereby incorporated by reference. Similarly, RFC 1492 describes TACACS and the Internet-Draft "The TACACS+Protocol Version 1.78," available at http://www.ietforg/internet-drafts/draft-grant-tacacs-02.txt, describes TACACS+. Both of these documents are incorporated herein by reference for all purposes.

The server may be associated with the Foreign Agent, such as a AAA server in the foreign network associated with the Foreign Agent. Alternatively, the server may be selected based upon the Mobile Node or a domain of the Mobile Node. For instance, a AAA server in a home network of the Mobile Node may be contacted via a request packet identifying the Foreign Agent. The AAA server may then identify one of a plurality of entries corresponding to the Foreign Agent, Mobile Node and/or domain of the Mobile Node to obtain one or more parameter values such as those set forth above from the identified entry. Thus, one or more of the parameter values may be associated with the Mobile Node, the domain of the Mobile Node, and/or the Foreign Agent.

Once the Foreign Agent composes the agent advertisement, the Foreign Agent sends the agent advertisement at 204. For instance, the Foreign Agent may send the agent advertisement to the detected Mobile Node, as well as other Mobile Nodes detected by the Foreign Agent. An exemplary process via which agent advertisements may be transmitted is set forth in RFC 3344.

While it is possible that the Foreign Agent may send the agent advertisement without being prompted by the Mobile Node, the Mobile Node may send an agent advertisement solicitation to the Foreign Agent to prompt the sending of the agent advertisement by the Foreign Agent. For instance, the Mobile Node may wish to update its data after initially receiving an agent advertisement from one or more Foreign Agents. Such a solicitation may be sent periodically or after the duration of validity of one or more of the parameter values has expired. The duration of validity of one or more of the parameter values may be communicated to the Mobile Node in an agent advertisement, as will be described in further detail below with reference to FIGS. 3 and 4.

When a Mobile Node receives an agent advertisement from one or more Foreign Agents, it may parse information in each agent advertisement at 206. More particularly, the Mobile Node may obtain one or more of the parameter values from each agent advertisement. In other words, the Mobile Node may be interested in only a portion of the information provided in the agent advertisement.

The Mobile Node may analyze the information it has obtained from an agent advertisement according to a variety of algorithms. For instance, the Mobile Node may analyze the obtained parameter values using a variety of calculations. For example, the Mobile Node may assign a weight to each of the obtained parameter values to perform a particular calculation. Such weights may be selected based upon those applications currently running on the Mobile Node and the requirements of those applications. In addition or instead of performing a mathematical calculation, the Mobile Node may traverse a decision tree or use other mechanism to logically analyze the obtained parameter values.

As one example, the Mobile Node may wish to select the Foreign Agent having the lowest "link pricing." Of course, the Mobile Node may need to access a particular type of link. As a result, the Foreign Agent having the lowest link pricing may not be desirable for a variety of other factors. For instance, different Foreign Agents may be associated with different types of access technologies. Such access technologies may include, for example, CDMA-1x-EVDO, UMTS, GPRS, and Wifi. Moreover, the Mobile Node may need a particular bandwidth capability to support its desired transmissions. The bandwidth associated with a particular access technology and/or Foreign Agent may be specified, for example, in a Quality of Service (QoS) field of the agent advertisement. Thus, other factors such as QoS may be taken into consideration in combination with factors such as link pricing. Link pricing information may be provided in one or more fields of the agent advertisement, as will be described in further detail below with reference to FIG. 3.

From the information the Mobile Node has obtained from the agent advertisements it has received from the Foreign Agents, the Mobile Node may select one of the Foreign Agents at 208. More particularly, in order to select one of the Foreign Agents based upon at least a portion of the information provided in the corresponding agent advertisements, the Mobile Node may wish to prioritize the Foreign Agents according to at least a portion of the information provided in the agent advertisements.

Once the Mobile Node has selected one of the Foreign Agents, it may register with a Home Agent by sending a registration request via the selected Foreign Agent to the Home Agent at 210. Upon completion of a successful registration, the Foreign Agent forwards the registration reply received from the Home Agent to the Mobile Node at 212. If the Mobile Node was already registered with its Home Agent via another Foreign Agent, the Mobile Node may send a de-registration request to the Home Agent indicating that the Mobile Node is no longer visiting the previously selected Foreign Agent.

Once the Mobile Node has successfully registered with the Home Agent, the Home Agent may provide one or more parameter values to the Foreign Agent for use in composing an agent advertisement. This may be desirable, for example, if one or more of the parameter values are pertinent to the Mobile Node or its domain. The process described with reference to blocks 202-212 may be repeated periodically upon receipt of additional agent advertisements.

The information that is provided in an agent advertisement at 204 of FIG. 2 may include a variety of parameter values and/or indicators. Exemplary agent advertisements will be described in further detail below with reference to FIGS. 3 and 4.

FIG. 3 is a diagram illustrating an exemplary agent advertisement. In this example, the agent advertisement 302 includes a plurality of fields for storing a plurality of parameter values. In order to identify the Foreign Agent, the agent advertisement may include an IP address of the Foreign Agent at 304. In addition, a priority of the Foreign Agent 304 with respect to other Foreign Agents may be provided.

Link pricing information may be specified via one or more parameters. For instance, a price per transmission of one or more (e.g., a specified number of) packets to another node via the Foreign Agent may be provided at 306. Similarly, a price per receipt of one or more (e.g., a specified number of) packets by the Mobile Node via the Foreign Agent may also be provided at 308. In addition, a price per a specified number of bytes transmitted via the Foreign Agent 310 may be provided, as well as a price per a specified number of bytes received via the Foreign Agent 312 may also be provided. A price per registration of the Mobile Node with a Home Agent via the Foreign Agent may also be specified at 314. Moreover, a price per duration of time that the Mobile Node is registered via the Foreign Agent may be specified at 316. For instance, a price per minute or hour may be specified.

Other parameters may also be specified. For instance, a number of hops between the Foreign Agent and the Mobile Node may be specified in a field such as a Time-To-Live (TTL) field, as shown at 318. As another example, a Quality of Service (QoS) parameter 320 may also be specified. For example, the QoS may indicate factors such as access technology, link state, link quality, bandwidth, etc. Other parameter values that may be dynamically obtained and provided in the agent advertisement include a date and/or time.

Since the information is provided dynamically via an agent advertisement or other suitable message, the information should be as current as possible. Thus, it may be desirable to indicate the duration of validity of one or more of the parameter values. The duration of validity of one or more of the parameter values specified in the agent advertisement may be provided as a parameter value of a field 322 of the agent advertisement. Thus, in this example, the duration of validity 322 may be associated with all of the parameter values 304-320. Alternatively, as shown in FIG. 4, one or more of the parameter values 304-320 may have an associated duration of validity value, as shown at 402-418, respectively. In other words, each of the fields 304-320 may have a separate duration of validity associated therewith.

The duration of validity of one or more parameter values may be specified in a variety of manners. For instance, the duration of validity may be specified by a particular time (e.g., expiration time) or a particular time period (e.g., 1 hour).

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Home Agent, Foreign Agent, or server) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 5:
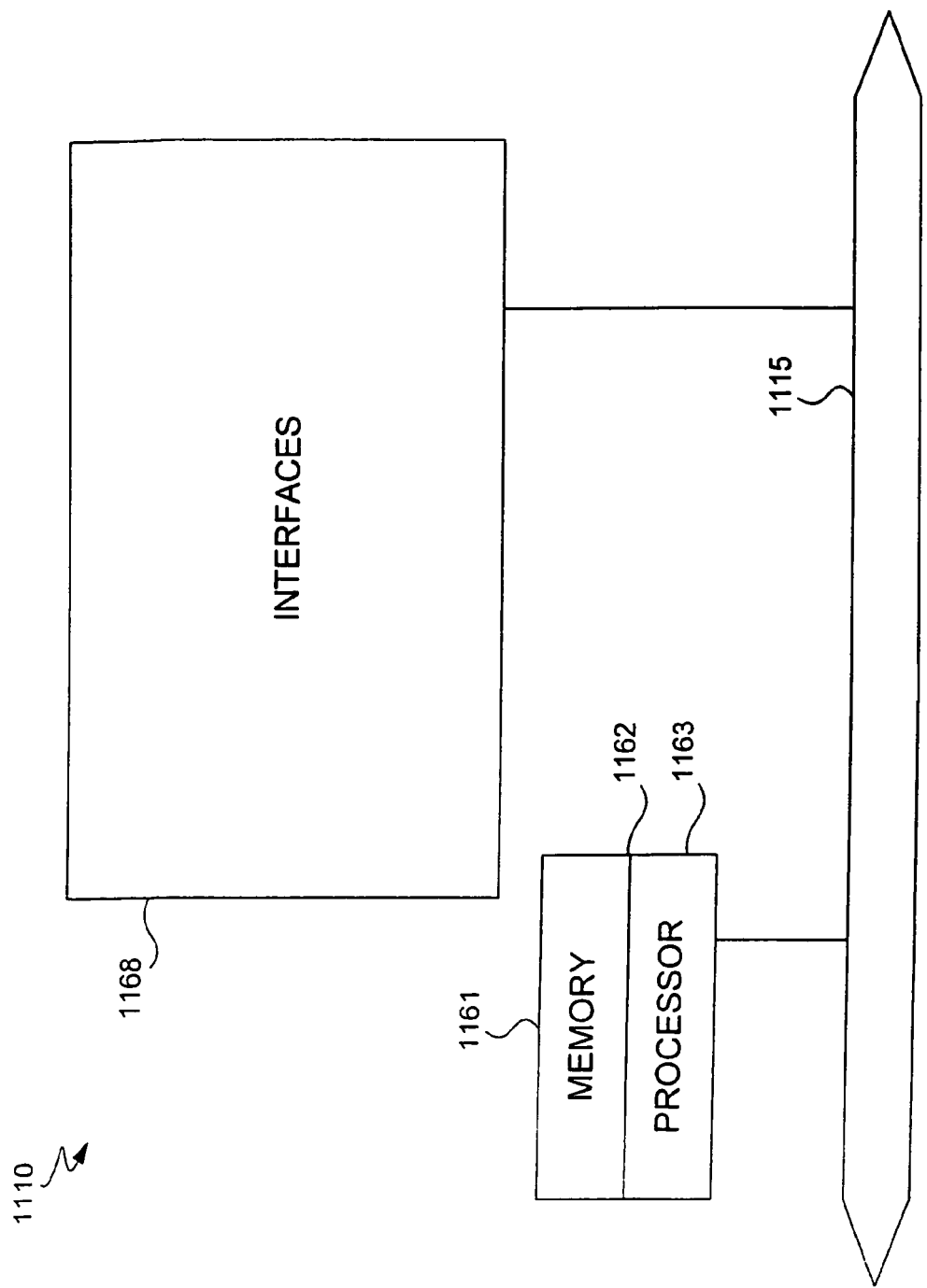
FIG. 5 is a diagrammatic representation of a router in which embodiments of the present invention may be implemented.

Referring now to FIG. 5, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 5 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for authentication and registration functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a computer-readable medium in which a carrier wave travels over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Moreover, although the example described refers primarily to IPv4, the present invention may be used with other versions of IP. In addition, although the description refers to the transmission of information by a Foreign Agent via an agent advertisement, such information may also be transmitted via other types of messages. Therefore, the described embodiments should be taken as illustrative and not restrictive, and the invention should not be limited to the details given herein but should be defined by the following claims and their full scope of equivalents.

What is claimed is:

1. In a Foreign Agent, a method, comprising:
  detecting a Mobile Node by the Foreign Agent;
  obtaining one or more parameter values by the Foreign Agent from a AAA server,
  composing an agent advertisement by the Foreign Agent, one or more fields of the agent advertisement comprising the one or more parameter values, wherein the parameter values indicate at least one of: 1) a price per registration of the Mobile Node with a Home Agent via the Foreign Agent, a first price per transmission of one or more packets to another node via the Foreign Agent and a second price per receipt of one or more packets by the Mobile Node via the Foreign Agent, wherein the price per registration is provided in a first one of the fields of the agent advertisement, the first price per transmission of one or more packets to another node via the Foreign Agent is provided in a second one of the fields of the agent advertisement, and the second price per receipt of one or more packets by the Mobile Node via the Foreign Agent is provided in a third one of the fields of the agent advertisement or 2) a price per registration of the Mobile Node with a Home Agent via the Foreign Agent, a third price per a number of bytes received via the Foreign Agent and a fourth price per number of bytes transmitted via the Foreign Agent, wherein the price per registration is provided in a first one of the fields of the agent advertisement, the third price per number of bytes received via the Foreign Agent is provided in a second one of the fields of the agent advertisement, and the fourth price per number of bytes transmitted via the Foreign Agent is provided in a third one of the fields of the agent advertisement, thereby enabling a Mobile Node to select from two or more Foreign Agents;
  sending the agent advertisement to the Mobile Node by the Foreign Agent; and
  receiving a registration request from the Mobile Node by the Foreign Agent, wherein the Foreign Agent is one of the two or more Foreign Agents.

2. The method as recited in claim 1, wherein at least one of the parameter values further indicates a number of hops between the Foreign Agent and the Mobile Node.

3. The method as recited in claim 1, wherein at least one of the parameter values further indicates a duration of validity of one or more of the parameter values.

4. The method as recited in claim 3, further comprising:
  receiving a solicitation of an agent advertisement after the duration of validity of one or more of the parameter values has expired.

5. The method as recited in claim 3, wherein the parameter values indicate a first duration of validity for a first one of the parameter values and a second duration of validity for a second one of the parameter values, wherein the first duration of validity is specified for the first one of the parameter values in a first duration of validity field of the agent advertisement, and wherein the second duration of validity is specified for the second one of the parameter values in a second duration of validity field of the agent advertisement.

6. The method as recited in claim 1, wherein the AAA server is selected by the Foreign Agent based upon the Mobile Node.

7. In a AAA server, a method, comprising:
receiving a request by the AAA server from a Foreign Agent, the request identifying the Foreign Agent;
obtaining information associated with the Foreign Agent by the AAA server from one of a plurality of entries, the plurality of entries corresponding to a plurality of Foreign Agents, the information indicating at least one of: 1) a price per registration of a Mobile Node via the Foreign Agent, a first price per transmission of one or more packets to another node via the Foreign Agent and a second price per receipt of one or more packets via the Foreign Agent or 2) a price per registration of a Mobile Node via the Foreign Agent, a third price per a number of bytes received via the Foreign Agent and a fourth price per number of bytes transmitted via the Foreign Agent; and
sending the information by the AAA server to the Foreign Agent, thereby enabling the Foreign Agent to send an agent advertisement including the information to a Mobile Node, one or more fields of the agent advertisement comprising one or more parameter values, wherein the parameter values indicate at least one of: 1) a price per registration of the Mobile Node with a Home Agent via the Foreign Agent, a first price per transmission of one or more packets to another node via the Foreign Agent and a second price per receipt of one or more packets by the Mobile Node via the Foreign Agent, wherein the price per registration is provided in a first one of the fields of the agent advertisement, the first price per transmission of one or more packets to another node via the Foreign Agent is provided in a second one of the fields of the agent advertisement, and the second price per receipt of one or more packets by the Mobile Node via the Foreign Agent is provided in a third one of the fields of the agent advertisement or 2) a price per registration of the Mobile Node with a Home Agent via the Foreign Agent, a third price per a number of bytes received via the Foreign Agent and a fourth price per number of bytes transmitted via the Foreign Agent, wherein the price per registration is provided in a first one of the fields of the agent advertisement, the third price per number of bytes received via the Foreign Agent is provided in a second one of the fields of the agent advertisement, and the fourth price per number of bytes transmitted via the Foreign Agent is provided in a third one of the fields of the agent advertisement, thereby enabling a Mobile Node to select from two or more Foreign Agents.

8. The method as recited in claim 1, further comprising:
receiving a solicitation of an agent advertisement from the Mobile Node,
wherein the solicitation is received prior to sending the agent advertisement.

9. A Foreign Agent, comprising:
a processor; and
a memory, at least one of the processor or the memory being configured for:
detecting a Mobile Node by the Foreign Agent;
obtaining one or more parameter values by the Foreign Agent from a Home Agent of the Mobile Node;
composing an agent advertisement by the Foreign Agent, one or more fields of the agent advertisement comprising the one or more parameter values, wherein the parameter values indicate at least one of: 1) a price per registration of the Mobile Node with a Home Agent via the Foreign Agent, a first price per transmission of one or more packets to another node via the Foreign Agent and a second price per receipt of one or more packets by the Mobile Node via the Foreign Agent, wherein the price per registration is provided in a first one of the fields of the agent advertisement, the first price per transmission of one or more packets to another node via the Foreign Agent is provided in a second one of the fields of the agent advertisement, and the second price per receipt of one or more packets by the Mobile Node via the Foreign Agent is provided in a third one of the fields of the agent advertisement or 2) a price per registration of the Mobile Node with a Home Agent via the Foreign Agent, a third price per a number of bytes received via the Foreign Agent and a fourth price per number of bytes transmitted via the Foreign Agent, wherein the price per registration is provided in a first one of the fields of the agent advertisement, the third price per number of bytes received via the Foreign Agent is provided in a second one of the fields of the agent advertisement, and the fourth price per number of bytes transmitted via the Foreign Agent is provided in a third one of the fields of the agent advertisement, thereby enabling a Mobile Node to select from two or more Foreign Agents;
sending the agent advertisement to the Mobile Node by the Foreign Agent; and
receiving a registration request from the Mobile Node by the Foreign Agent, wherein the Foreign Agent is one of the two or more Foreign Agents.

10. In a Mobile Node, a method, comprising:
receiving an agent advertisement from two or more Foreign Agents, the agent advertisement associated with each of the Foreign Agents including information provided as parameter values of one or more fields of the agent advertisement, the parameter values comprising a price per registration of the Mobile Node with a Home Agent via the Foreign Agent, a price per number of bytes received via the Foreign Agent, and a price per number of bytes transmitted via the Foreign Agent, thereby enabling a Mobile Node to select from two or more Foreign Agents, wherein the price per registration is provided in a first one of the fields of the agent advertisement, the price per number of bytes received via the Foreign Agent is provided in a second one of the fields of the agent advertisement, and the price per number of bytes transmitted via the Foreign Agent is provided in a third one of the fields of the agent advertisement;
selecting one of the Foreign Agents based upon the two or more parameter values provided in each of the agent advertisements received from the two or more Foreign Agents;
sending a registration request to a Home Agent via the selected Foreign Agent; and
receiving a registration reply from the Home Agent via the selected Foreign Agent.

11. The method as recited in claim 10, prioritizing the Foreign Agents according to the parameter values provided in each of the agent advertisements.

12. The method as recited in claim 10, further comprising:
sending a de-registration request to the Home Agent via the selected Foreign Agent.

13. The method as recited in claim 10, further comprising:
parsing the information provided in the agent advertisements to obtain each of the two or more of parameter values provided in each of the agent advertisements;
wherein selecting includes assigning a weight to each of the obtained parameter values.

14. The method as recited in claim 10, wherein at least one of the parameter values in each of the agent advertisements further indicates a number of hops between the Foreign Agent and the Mobile Node.

15. The method as recited in claim 10, wherein at least one of the parameter values further indicates a different duration of validity for each of the parameter values provided in each of the agent advertisements.

16. The method as recited in claim 15, further comprising:
sending a solicitation of an agent advertisement to one or more of the Foreign Agents after the duration of validity of at least one of the parameter values received from the corresponding Foreign Agent has expired.

17. The method as recited in claim 15, wherein each of the agent advertisements further comprises a fourth field and a fifth field, wherein a first duration of validity is specified in the fourth field for a first one of the parameter values and a second duration of validity is specified in the fifth field for a second one of the parameter values.

18. The method as recited in claim 10, further comprising:
sending a solicitation of an agent advertisement to one or more of the Foreign Agents.

19. The method as recited in claim 7, wherein the one or more of the parameter values are stored by the AAA server such that the one or more parameter values are associated with the Mobile Node.

20. The method as recited in claim 1, wherein the one or more of the parameter values are stored by the AAA server such that the one or more parameter values are associated with a home domain of the Mobile Node.

21. The method as recited in claim 1, wherein the AAA server is in a home network of the Mobile Node.

22. The method as recited in claim 1, wherein the AAA server is in a foreign network associated with the Foreign Agent.

23. The method as recited in claim 10, further comprising:
traversing a decision tree to select one of the two or more Foreign Agents based upon the obtained parameter values.

24. The method as recited in claim 7, wherein the information that is obtained corresponds to the Mobile Node.

25. The method as recited in claim 7, wherein the information that is obtained corresponds to a home domain of the Mobile Node.

26. The method as recited in claim 7, wherein the AAA server is in a home network of the Mobile Node.

27. The method as recited in claim 1, wherein the one or more of the parameter values are stored by the AAA server such that the one or more parameter values are associated with the Foreign Agent.

28. The method as recited in claim 10, wherein the parameter values further comprise a price per transmission of one or more packets to another node via the Foreign Agent and a price per receipt of one or more packets by the Mobile Node via the Foreign Agent, wherein the price per registration is provided in a first one of the fields of the agent advertisement, the price per number of bytes received via the Foreign Agent is provided in a second one of the fields of the agent advertisement, the price per number of bytes transmitted via the Foreign Agent is provided in a third one of the fields of the agent advertisement, the price per transmission of one or more packets to another node via the Foreign Agent is provided in a fourth one of the fields of the agent advertisement, and the price per receipt of one or more packets by the Mobile Node by the Foreign Agent is provided in a fifth one of the fields of the agent advertisement.

29. The method as recited in claim 1, wherein the parameter values indicate 1) a price per registration of the Mobile Node with a Home Agent via the Foreign Agent; 2) a first price per transmission of one or more packets to another node via the Foreign Agent and a second price per receipt of one or more packets by the Mobile Node via the Foreign Agent; and 3) a third price per a number of bytes received via the Foreign Agent and a fourth price per number of bytes transmitted via the Foreign Agent, wherein the price per registration is provided in a first one of the fields of the agent advertisement, the price per number of bytes received via the Foreign Agent is provided in a second one of the fields of the agent advertisement, the price per number of bytes transmitted via the Foreign Agent is provided in a third one of the fields of the agent advertisement, the price per transmission of one or more packets to another node via the Foreign Agent is provided in a fourth one of the fields of the agent advertisement, and the price per receipt of one or more packets by the Mobile Node by the Foreign Agent is provided in a fifth one of the fields of the agent advertisement.

30. The method as recited in claim 1, further comprising:
composing a second agent advertisement by the Foreign Agent and sending the second agent advertisement to the Mobile Node by the Foreign Agent, one or more fields of the second agent advertisement comprising one or more parameter values, wherein the parameter values of the second agent advertisement indicate at least one of: 1) the price per registration of the Mobile Node with a Home Agent via the Foreign Agent, a fifth price per transmission of one or more packets to another node via the Foreign Agent and a sixth price per receipt of one or more packets by the Mobile Node via the Foreign Agent, wherein the price per registration is provided in a first one of the fields of the second agent advertisement, the fifth price per transmission of one or more packets to another node via the Foreign Agent is provided in a second one of the fields of the second agent advertisement, and the sixth price per receipt of one or more packets by the Mobile Node via the Foreign Agent is provided in a third one of the fields of the second agent advertisement or 2) the price per registration of the Mobile Node with a Home Agent via the Foreign Agent, a seventh price per a number of bytes received via the Foreign Agent and an eighth price per number of bytes transmitted via the Foreign Agent, wherein the price per registration is provided in a first one of the fields of the second agent advertisement, the sixth price per number of bytes received via the Foreign Agent is provided in a second one of the fields of the second agent advertisement, and the seventh price per number of bytes transmitted via the Foreign Agent is provided in a third one of the fields of the second agent advertisement.

31. The method as recited in claim 30, wherein at least one of: 1) the first price is different from the fifth price; 2) the second price is different from the sixth price; 3) the third price is different from the seventh price, or 4) the fourth price is different from the eighth price.

32. The method as recited in claim 1, wherein the first price per transmission of one or more packets to another node via the Foreign Agent is specific to the Mobile Node and wherein the second price per receipt of one or more packets by the Mobile Node via the Foreign Agent is specific to the Mobile Node.

33. The method as recited in claim 1, wherein the third price per number of bytes received via the Foreign Agent is specific to the Mobile Node and wherein the fourth price per number of bytes transmitted via the Foreign Agent is specific to the Mobile Node.

34. The method as recited in claim 1, wherein the one or more parameter values of the agent advertisement further indicates a Quality of Service (QoS) provided by the Foreign Agent.

35. The method as recited in claim 10, wherein the parameter values of each agent advertisement received from the two or more Foreign Agents further comprising a Quality of Service (QoS) provided by the corresponding one of the two or more Foreign Agents.

36. The method as recited in claim 30, wherein composing the second agent advertisement by the Foreign Agent and sending the second agent advertisement to the Mobile Node by the Foreign Agent are performed after a duration of validity of at least one of the parameter values has expired.

37. The method as recited in claim 9, wherein at least one of the parameter values further indicates a number of hops between the Foreign Agent and the Mobile Node.

38. The Foreign Agent as recited in claim 9, wherein at least one of the parameter values further indicates a duration of validity of one or more of the parameter values.

39. The Foreign Agent as recited in claim 38, at least one of the processor or the memory being configured for:
  receiving a solicitation of an agent advertisement after the duration of validity of one or more of the parameter values has expired.

40. The Foreign Agent as recited in claim 38, wherein the parameter values indicate a first duration of validity for a first one of the parameter values and a second duration of validity for a second one of the parameter values, wherein the first duration of validity is specified for the first one of the parameter values in a first duration of validity field of the agent advertisement, and wherein the second duration of validity is specified for the second one of the parameter values in a second duration of validity field of the agent advertisement.

* * * * *